United States Patent [19]

Marin

[11] Patent Number: 4,935,742

[45] Date of Patent: Jun. 19, 1990

[54] AUTOMATIC RADAR GENERATOR

[76] Inventor: Jonathan Marin, 11 Schermerhorn St., Apartment 3WA, Brooklyn, N.Y. 11201

[21] Appl. No.: 340,380

[22] Filed: Apr. 19, 1989

[51] Int. Cl.$^5$ .......................... G01S 7/282; G01S 13/86
[52] U.S. Cl. .......................................... 342/13; 342/53
[58] Field of Search ....................... 342/69, 13, 16, 27, 342/51, 28, 88, 137, 53; 455/92

[56] References Cited

U.S. PATENT DOCUMENTS

| | | | |
|---|---|---|---|
| 2,521,683 | 9/1950 | Barker | 342/69 X |
| 3,895,227 | 7/1975 | Murray et al. | 362/264 X |
| 4,295,131 | 10/1981 | Bonori et al. | 342/28 X |
| 4,435,699 | 3/1984 | Tacussel | 342/28 X |
| 4,757,304 | 7/1988 | Rho | 340/522 |

OTHER PUBLICATIONS

FCC Report No. 4872, "*FCC Rules Out Drone Radars, Warns Against Their Use*", May. 1978.
Newscope, "*Speeders Beware: The Cops can Fake You Out*", Electronic Design 26, Dec. 1977, p. 19.
"*Highway Radar Eludes Detectors*", Electronics, Sep. 1977, pp. 45–46.
"Antennas at X or K Band Frequencies", M/A–COM GaAs Products, Inc., product data sheet, pp. 1–4.

ENR article, "Barriers Remain to Safe Work Zones", Howard B. Stussman, pp. 1–2, Apr. 7, 1988.

*Primary Examiner*—Gilberto Barron, Jr.
*Attorney, Agent, or Firm*—Hamilton, Brook, Smith & Reynolds

[57] ABSTRACT

An autonomous radar transmitting system transmits radar signals which simulate the presence of a police-manned radar station. A controller runs pseudo-randomizing programs to select the width of a radar pulse transmitted as well as the time lapse between subsequent pulses. The radar output of the system is therefore sufficiently random to prevent a detecting circuit from identifying it in the time it takes for a motorist with a radar detector to reach the radar source. This system is battery powered and a photovoltaic panel is provided to recharge the battery, thus giving the system a long lifespan. Also provided is an infrared detector through which infrared signals may be input to the controller. Thus, external control is provided without making the system susceptible to tampering or vandelism. Most of the electrical components are enclosed in a weatherproof casing capable of being mounted in a number of discrete, convenient locations. The casing includes a drainage hole with a downwardly extending tube for allowing the drainage of condensation buildup within the casing.

24 Claims, 3 Drawing Sheets

AUTOMATIC RADAR GENERATOR

BACKGROUND OF THE INVENTION

Traditionally, enforcement of traffic speed laws has been difficult due to the enormous number of roadways to be monitored by a relatively small number of police officers. The adoption of radar systems by police forces across the nation for use in apprehending violators of the speed laws has simplified the task of enforcing these laws. However, the effectiveness of radar systems has been greatly reduced by the introduction of radar detectors to the commercial market. These devices can detect the presence of police radar, allowing a motorist with a radar detector to reduce speed before being detected by the police radar system. Ironically, those motorists who show an intent to break speed laws by purchasing commercial radar detectors are the least likely to be apprehended for speeding violations.

The introduction of hand held radar guns has been somewhat successful in thwarting radar detector owners who break speed laws. With such a system, a police officer can aim a radar gun at a moving vehicle before actually turning on the system and generating a radar pulse. Nonetheless, these radar pulses are still picked up further down the road by radar detector owners, who react accordingly to avoid being apprehended.

SUMMARY OF THE INVENTION

The present invention provides an self-contained automatic radar transmitting system for simulating the presence of a police-manned radar station. The system includes a signal generator operating at a frequency and signal strength sufficient to cause an alert status in a radar detector when used to transmit a signal. A microwave antenna is included for transmitting the signal, along with a power source for providing electrical power to the system. Radar signal pulses are generated by the signal generator and transmitted through the antenna. The generation of pulses is controlled via a transmitter switch between the power source and the signal generator. A controller which may or may not be a microprocessor is included within the system and provides a control signal to which the transmitter switch responds. The controller closes the switch for a predetermined duration of time at somewhat regular time intervals.

The power source of the radar transmitting system can be a battery which may be used in conjunction with a photovoltaic panel. The battery supplies electrical power to all the components of the system, and the photovoltaic panel collects solar energy and converts it to electricity which is regularly applied to the battery. The application of charge to the battery from the photovoltaic panel is governed by a charge control device responsive to the charge level of the battery. The charge control device prevents transfer of charge from the photovoltaic panel to the battery if the charge level of the battery reaches a predetermined maximum. This prevents overcharging of the battery.

The controller may be designed to monitor the battery to prevent the charge level from becoming too low. If the battery charge level drops below a predetermined minimum, the controller responds by increasing the time period between closings of the transmitter switch. This prevents the battery from discharging to a dangerously low level when there is not enough solar energy present to sufficiently recharge it.

The controller can be made to respond to an external control signal which causes the controller to put the system into an idle state by suspending operation of the transmitter switch. Designing the controller to reinstitute control of the transmitter switch upon receiving a second external control signal allows the system to be turned on and off when desired. If an infrared detector is added which is capable of receiving infrared signals and converting them to electrical signals, an infrared remote control may be used to switch the system on and off. The application of power to the infrared detector may also be governed by the controller, allowing the detector to be run on a duty cycle to conserve battery power. To simplify the switching on and off of the system by remote control when the detector is operating on a duty cycle, the controller may be set to respond to a preparatory signal input from the detector. This signal may be simple in nature and when received causes the controller to provide continuous power to the detector for a predetermined period of time before returning it to the duty cycle. The detector is therefore put on a temporary ready status, preparing it for receipt of a system control signal.

A second microwave antenna may be used to transmit the same radar signal in a direction other than the transmitting direction of the first microwave antenna. This allows the radar transmitting system to cover a second region of interest with a signal from the same signal generator. The radar transmitting system may also be made to generate the radar pulses in a somewhat random fashion. The controller may be made to close the transmitter switch for a substantially random duration of time, the selected duration being limited to a predetermined time range. Each time the controller closes the switch, a different duration is randomly selected from the range provided. Similarly, the time interval between generated pulses may also be made substantially random in nature. The controller uses an appropriate range of times from which it may select. The time between closings of the transmitter switch is randomly chosen by the controller from the time range provided.

DESCRIPTION OF THE PREFERRED EMBODIMENT

Figure 1:
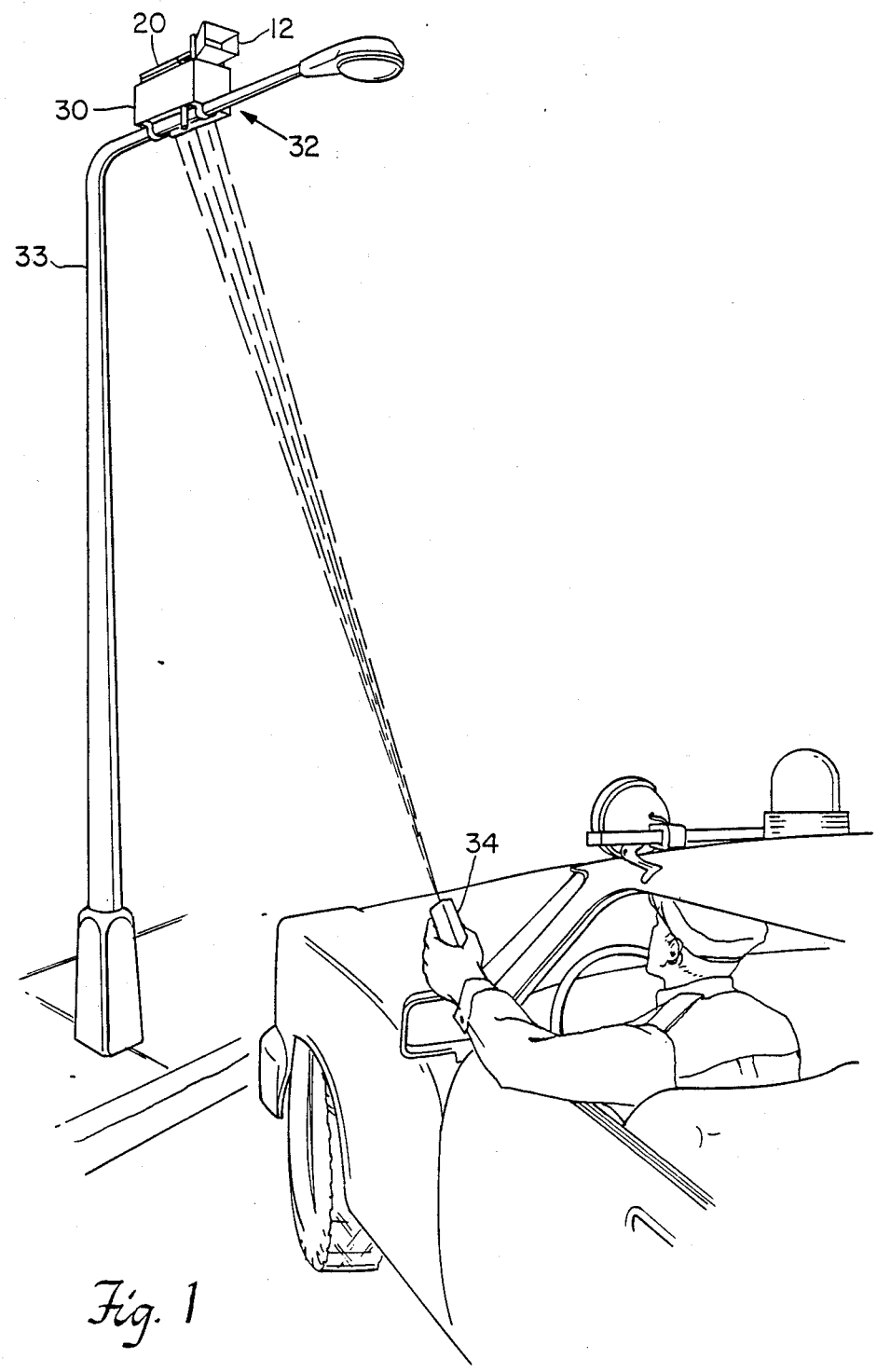
FIG. 1 shows the device mounted in a typical location, and a subject controlling the system with a remote control.

FIG. 1 shows a radar transmitting system 32 partially enclosed in a weatherproof casing 30, which will be described in detail later. A microwave antenna 12 and photovoltaic panel 20 are shown outside casing 30. The system 32 is mounted on a light post 33 over a roadway where it is likely to be used. It is one purpose of this invention to put forth a system which may be used on a state-wide level. By placing a radar transmitting system every several miles along every major highway in a state, the primary speeding zones in the state would be saturated with radar signals. Thus, a radar detector would be rendered effectively useless throughout the state. Because of the obvious threat of vandalism, the radar transmitting system must be autonomous. Power cords or control lines within easy reach would invite tampering.

The location of the device in FIG. 1 is out of reach and provides a good spot from which to transmit radar signals down the roadway. Other possible locations of the transmitting system are on road signs or highway overpasses. A typical user of the system, in this case a police officer, is shown with hand-held infrared transmitter 34. The transmitter 34 allows control of the system without the necessity of control wires being at ground level, which could be easily vandalized. The transmitter 34 transmits coded signals to which the controller in the radar transmitting system has been programmed to respond. The signal is received by an infrared detector which converts it to an electrical signal input.

Figure 2:
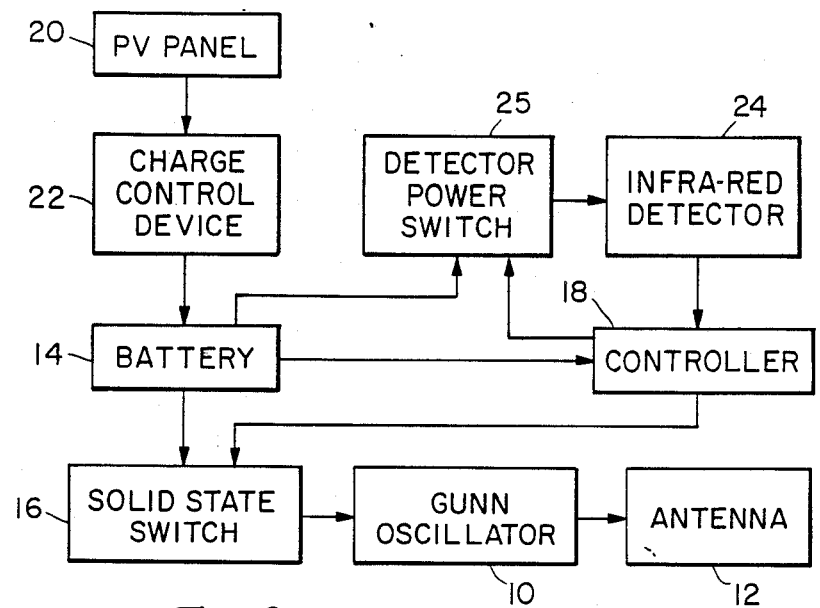
FIG. 2 shows a system block diagram with relative connectors between the blocks.

The block diagram of FIG. 2 shows the functional interaction of the components of a preferred embodiment of the radar transmitting system. The core of the system is a signal generator, which in this case is a Gunn oscillator 10, such as the M/A-Com 86651A for X-band or M/A-Com 86790A for K-band operation. The Gunn oscillator 10 is designed to generate radar signals, similar to those used for police speed sensing radar, to be output to a microwave antenna 12, such as the M/A-Com 86552 for K-band or M/A-Com 86554 for X-band. The signals typically generated are in the X-band or the K-band, as these are generally the bands monitored by commercial radar detectors. However, the system is not limited to these two bands. The requirement of the signal generator is that it generate a signal which when transmitted using the antenna 12 causes commercial radar detectors to signal an alert. The exact model of signal generator 10 and antenna is not critical as long as they satisfy this requirement. The design of Gunn oscillators and antennas is commonly known in the art, and they are commercially available with features to satisfy individual system requirements.

The signal pulses output through antenna 12 from Gunn oscillator 10 are controlled in duration and separation by controlling the supply of power to the Gunn oscillator 10. The system is powered from a battery 14 which is preferably of a gel or ni-cad type. Power from the battery 14 to the Gunn oscillator 10 is controlled through transmitter switch 16. The switch 16 closes and opens in response to a control signal from a controller 18.

The controller is a digital logic circuit based on a microprocessor such as the Motorola 63HCC11. The controller 18 closes and opens the solid state switch 16 according to a pseudo-randomizing program stored in the controller. The program selects values for the signal duration (pulse width) and separation of the generated pulses. Stored in the controller are predetermined numerical ranges from which each of these values is selected. The pseudo-randomizing program then selects a value from each of the provided ranges in a substantially random fashion. The range provided for the pulse width is from 1½ to 3½ seconds, and the time between pulses (pulse separation) ranges from 6 to 22 seconds.

The substantially random nature of the radar signals produced by the radar transmitting a system is an important design feature. If the pulses were periodic, or if they all had the same pulse width, a circuit could be designed to detect the regular nature of the transmitting system and identify it is not being an actual police-manned radar station. Although a pseudo-randomizing program in a finite state machine must eventually repeat, the length of the repeating sequence is long enough that it cannot be detected before a motorist with a radar detector detecting the signal reaches the source of the radar.

To make the system truly autonomous, a method of recharging the battery 14 is required. The present embodiment includes photovoltaic panel 20 which collects solar radiation and converts it to electricity to be applied to the battery 14 for recharging purposes. To prevent the battery 14 from overcharging, a charge control device is placed between the battery 14 and the photovoltaic panel 20. The charge control device 22 acts as a voltage regulator by monitoring the charge on the battery 14 and restricting the flow of electricity from the photovoltaic panel 20 when the charge on the battery 14 reaches maximum. Such charge control devices are commonly known in the art and are commercially available, many designed to work specifically with photovoltaic elements.

The pseudo-random nature of the signal generation also conserves power in the system. The Gunn oscillator 10 consumes a considerable amount of power when operated, and it is not practical to power it continuously. Even with the solar panel 20. The drain on the battery 14 is too severe when the Gunn oscillator 10 is run continuously.

Also shown in the block diagram of FIG. 2 is an infrared detector 24 such as the Motorola MC 3373. The infrared detector receives coded infrared signals and converts them to electrical signals to be input to the controller 18. The infrared detector 20 allows the system to be turned on and off from a remote control unit. The controller 18 responds to the signals input through the infrared detector 24. Upon receiving a particular signal input from the infrared detector 24, the controller suspends operation of the transmitter switch 16 causing the Gunn oscillator 10 to become idle. Upon receiving a second coded signal input from the infrared detector 24, the controller 18 reactivates the operational cycle of the transmitter switch 16. Thus the system may be effectively switched on and off from a remote infrared transmitter, as shown in FIG. 1. Included with controller 18 is a timing circuit which starts when operation of the transmitter switch is suspended. After running for one hour, the timer times out and controller 18 restarts the operation cycle of transmitter switch 16. A police officer may suspend operation of the unit with the remote control unit in order to set up a radar station, and then be called away on an emergency. The one hour timer feature thereby ensures that the unit is reactivated automatically after an hour.

The infrared detector 24 is powered by battery 14 through a detector power switch 25 responsive to a control signal from controller 18. In an effort to conserve battery power, the infrared detector is run on a duty cycle, being powered up for one half second every 10 seconds. This duty cycle is generated by the controller 18 which enables or disables the detector power switch 25 according to a timing cycle program. To simplify the input of an infrared code signal to the controller 18 through infrared detector 24, the controller is also designed to respond to a preparatory input signal through the infrared detector. The preparatory signal is a simple signal such as a digital sequence of all high logic levels. Upon identification of this preparatory signal input, the controller closes the detector switch temporarily to provide continuous power to the infrared detector 24 for a selected period of time. The infrared detector 24 is thus made ready to receive more complicated control signals used to alter system status.

Figure 3:
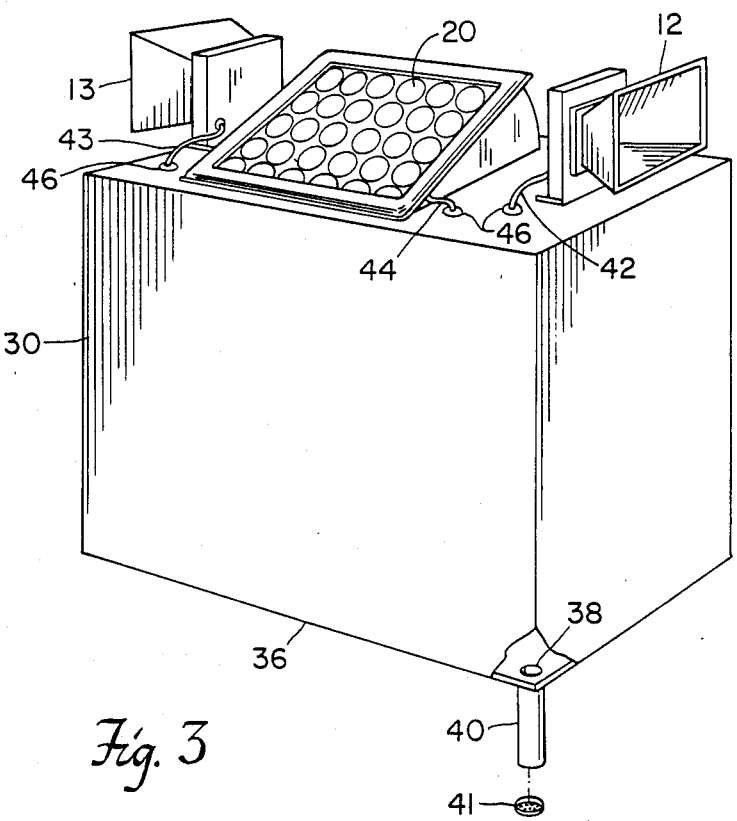
FIG. 3 shows two microwave antennas, the photovoltaic panel, and the weatherproof casing surrounding the system electronics with the drainage tube extending from the bottom of the casing.

To protect the delicate electronic circuitry of the radar transmitting system, an aluminum weatherproof casing 30 encloses all system components except the photovoltaic panel 20 and microwave antennas 12, 13. FIG. 3 shows the external casing 30 along with photovoltaic panel 20 and antennas 12, 13. The purpose of having two antennas 12, 13 is to allow the same signal from the Gunn oscillator to be transmitted in two different directions. This allows the unit to cover more area with the radar transmitter. One example for using both antennas is in the case where it is desirable to transmit towards cars travelling in both directions along a roadway. Thus, twice as many radar detector owners may be foiled with the same unit.

Photovoltaic panel 20 may be adjusted an angle and direction to maximize year round collection of solar radiation. The radar transmitting system of FIG. 3 is intended to be used in the vicinity of Boston, Mass. and the panel is therefore angled 57° toward the south to maximize efficiency. The panel may also be coated with a transparent shielding material such as Rain-X, produced by Uneko Corp. Such a coating is transparent to solar radiation and helps to keep the panel surfaces free from contamination. The slippery nature of the coating allows dirt and other accumulations to rinse away easily with a heavy rainfall.

The casing 30 is made of aluminum formed into a somewhat rectangular shape. Because the casing is aluminum, it is relatively easy to stamp holes in different parts of the casing for attaching a mounting bracket in a convenient location. A standard casing form may therefore be used for ease of manufacture. The unused holes can be plugged with rubber stoppers to seal the casing at these points.

The bottom portion 36 of casing 30 is designed to have an uneven surface, one corner of the surface being lower than the rest of the surface. A drainage hole 38 is punched in the bottom portion 36 at the low corner to allow condensation inside the casing to drain. The electronics within the casing will generate heat and retain a slightly higher temperature than the surface of the casing 30. Thus, moisture within the casing will condense out on the casing surface and drain out through the drainage hole 38. A drainage tube 40 leads downward from drainage hole 38 and channels moisture being drained through the drainage hole. The drainage tube 40 serves as an extended vertical channel which prevents moisture, dirt, and other undesirable substances from accidentaly entering the casing through drainage hole 38. The bottom of the drainage tube 40 is covered by a screen 41 to prevent any unwanted elements, such an insects, from entering the casing 30 through the drainage tube 40.

Antenna 12, 13 are foam filled to protect them from moisture, insects, and other undesirable environmental hazards. Antenna cables 42, 43 lead from the antennas 12, 13 through openings in the casing and to the Gunn oscillator. The photovoltaic panel 20 is completely weatherproof and has a cable 44 which leads through a hole in the casing 30 to the charge control device 22. Gasket seals 46 around all cables ensure that the outer casing 30 remains weathertight.

Figure 4:
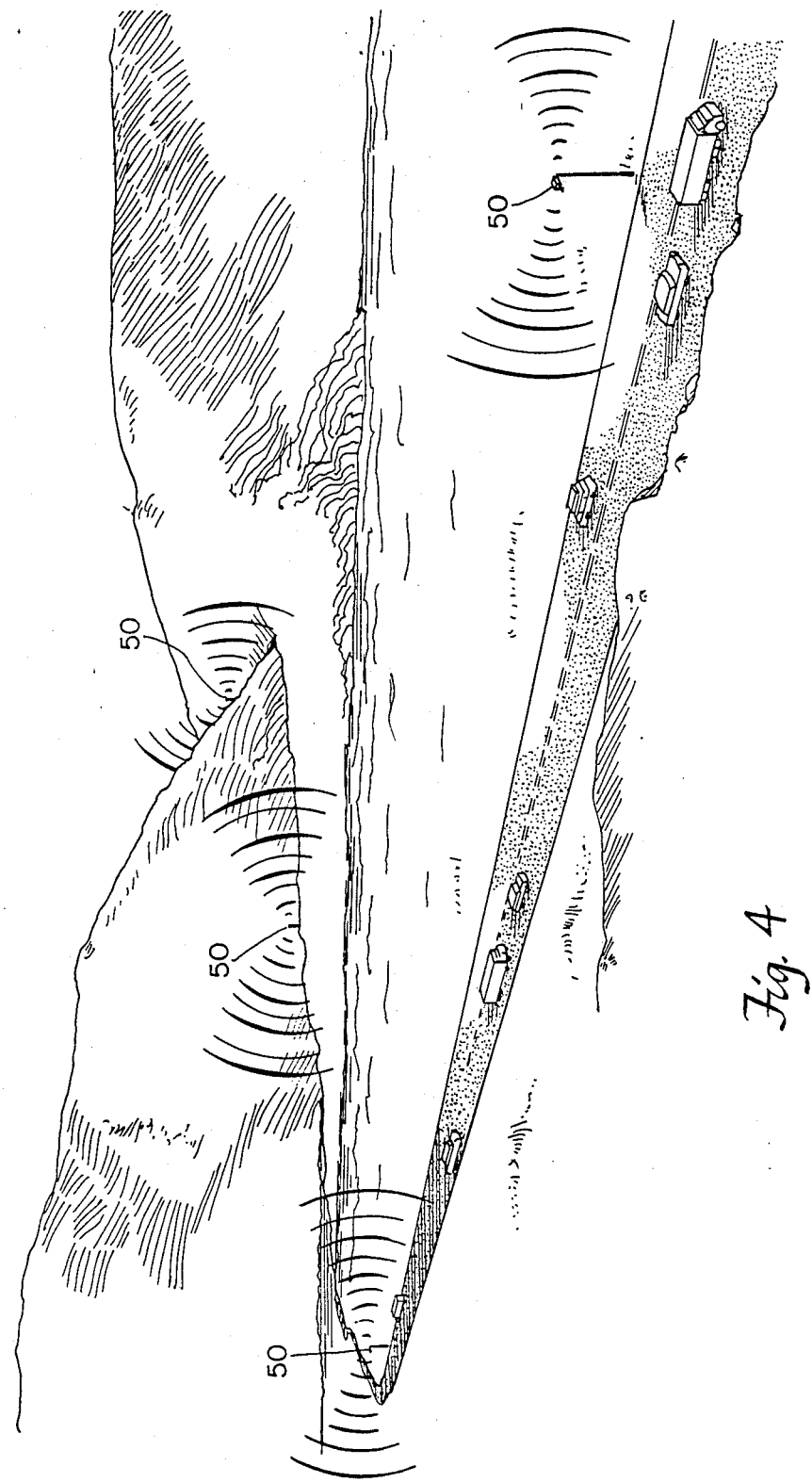
FIG. 4 shows a section of roadway with a radar transmitting system placed every several miles.

FIG. 4 shows a section of roadway with a radar transmitting system 50 placed every several miles. Each of these systems 50 is of the bidirectional type, as can be seen by the illustrated indication of the radar waves. This allows both directions along one area of roadway to be covered by one radar transmitting system 50. Spacing out the placement of the transmitters 50 in such a fashion provides a means to deter a radar detector owner from speeding along the roadway. If it was so desired, a police officer could turn off any or all of the transmitters and set up an actual radar trap. Such a system effectively removes the ability of the radar detector owner to break speed laws while avoiding radar traps.

I claim:

1. An automatic radar transmitting system for simulating the presence of a police-manned radar station, the system comprising:
    a radar signal generator generating signals at a frequency and signal strength sufficient to cause an alert status in a radar detector when the signal is transmitted by a microwave antenna;
    a microwave antenna for transmitting signals from the signal generator;
    a power source for providing electrical power to the system;
    a transmitter switch between the power source and the signal generator;
    a controller for controlling the transmitter switch, the controller repeatedly generating a control signal which closes the switch for selected durations of time to cause the radar signal generator to generate said radar signals, said time durations being substantially random within a range of durations, the switch closings occurring at time intervals which are substantially random within a range of intervals, the controller also comprising means for responding to external input signals, a first external input signal causing the controller to put the system into an idle state by ceasing to close the transmitter switch and a second external input signal causing the controller to begin closing the transmitter switch again;
    a radiation detector for receiving coded radiation signals and converting them to electrical signals which are input to the controller as said external input signals; and
    a detector switch through which the detector receives power from the power source, the controller comprising means for applying a control signal to the detector switch which closes the detector switch, the control signal being applied to the detector switch periodically such that the detector operates on a duty cycle.

2. The radar transmitting system of claim 1 wherein the controller comprises a microprocessor.

3. The radar transmitted system of claim 1, wherein one of said external input signals is a preparatory signal input to the controller from the radiation detector, the preparatory signal being received while the radiation detector is operating on the duty cycle, and wherein the controller further comprises means for responding to the preparatory signal by closing the detector switch to provide continuous power to the radiation detector for a predetermined period of time before returning it to the duty cycle.

4. The radar transmitting system of claim 1, further comprising a second microwave antenna for transmitting the radar signals in a direction other than the transmitting direction of the first microwave antenna, and where the output of the signal generator is divided and transmitted using both microwave antennas.

5. The radar transmitting system of claim 1, wherein the radiation detector is an infrared detector.

6. The radar transmitting system of claim 1 wherein the power source comprises a battery and a photovoltaic panel, wherein the photovoltaic panel collects solar energy and converts it to electricity which is applied to the battery, replenishing charge to the battery as charge is expended powering the system.

7. The radar transmitting system of claim 6 further comprising a charge control device through which the the charge transfer from the photovoltaic panel to the battery is controlled, such that when the charge on the battery reaches a predetermined maximum, the charge control device prevents charge transfer from the photovoltaic panel to the battery.

8. The radar transmitting system of claim 6, wherein the controller further comprises means for monitoring the charge level of the battery and increasing the time period of the intervals between closings of the transmitter switch as the change level on the battery decreases.

9. The radar transmitting system of claim 6 further comprising a weatherproof casing in which the radar signal generator, the battery, and the controller reside.

10. The radar transmitting system of claim 9 wherein said weatherproof casing is aluminum.

11. The radar transmitting system of claim 9 wherein the weatherproof casing includes a drainage hole in the bottom portion of the casing, the hole being in a region of the bottom portion of the casing substantially lower than the rest of the bottom portion of the casing, such that moisture condensing on the inside of the casing will drain through the drainage hole.

12. The radar transmitting system of claim 11 further comprising a section of tubing sealed to and extending downward from the region of the bottom portion of the weatherproof casing surrounding the drainage hole.

13. The radar transmitting system of claim 12 further comprising a screen covering the open portion of the bottom of the section of tubing.

14. An automatic radar transmitting system for simulating the presence of a police-manned radar station, the system comprising:

a radar signal generator generating radar signals at a frequency and signal strength sufficient to cause an alert status in a radar detector when the signal is transmitted by a microwave antenna;

a microwave antenna for transmitting signals from the signal generator;

a power source comprising a battery and a photovoltaic panel, wherein the battery powers the system and the photovoltaic panel collects solar energy, converting it to electricity which is applied to the battery to replenish charge to the battery as charge is expended from the battery, the charge passing through a charge control device which prevents the charge transfer from the photovoltaic panel to the battery when the charge on the battery reaches a predetermined maximum;

a transmitter switch between the power source and the signal generator, the switch being responsive to a control signal;

a controller for controlling the system, the controller comprising means for responding to external input signals and means for generating control signals, a first control signal controlling the transmitter switch and closing the transmitter switch repeatedly for selected durations of time, said time durations being substantially random within a range of durations, the switch closings occurring at time intervals which are substantially random within a range of intervals, a first external input signal being indicative of the charge level on the battery and causing the controller to respond by modifying said first control signal to lengthen the time between transmitter switch closings beyond said range of intervals as the charge on the battery decreases below a predetermined level, a second external input signal causing the control to respond by ceasing to generate said first control signal, leaving the transmitter switch in an open position, and a third external control signal causing the controller to respond by recommencing generation of said first control signal; and an infrared detector for receiving infrared signals and converting them to electrical signals which are input to the controller as external input signals, the detector receiving power through a detector power switch controlled by one of said control signals, the detector power switch being closed periodically such that the detector is operated on a duty cycle.

15. The radar transmitting system of claim 14 further comprising a weatherproof casing in which the radar signal generator, the battery, and the controller reside, the bottom portion of the casing including a drainage hole in a region of the bottom portion of the casing substantially lower than the rest of the bottom portion of the casing such that moisture condensing on the inside of the casing will drain through the drainage hole.

16. The radar transmitting system of claim 15 further comprising a section of tubing sealed to and extending downward from the region of the bottom portion of the weatherproof casing surrounding the drainage hole.

17. The radar transmitting system of claim 16 further comprising a screen covering the open portion of the bottom of the section of tubing.

18. An automatic radar transmitting system for simulating the presence of a police-manned radar station, the system comprising:

a radar signal generator generating a signal at a frequency and signal strength sufficient to cause an alert status in a radar detector when the signal is transmitted by a microwave antenna;

a microwave antenna for transmitting signal from the signal generator;

a power source for providing electrical power to the system;

a transmitter switch between the power source and the signal generator;

a controller comprising means for generating control signals and means for responding to external input signals, a first control signal controlling the transmitter switch, the switch being closed repeatedly for selected durations of time;

a radiation detector for receiving coded radiation signals and converting them to coded electrical signals which are input to the controller as external input signals, a first external input signal causing the controller to cease closing the transmitter switch; and a detector switch through which the radiation detector receives power, the switch closing in response to a second control signal from the controller, the second control signal being applied to the switch periodically such that the detector operates on a duty cycle.

19. The radar transmitting system of claim 18, wherein the controller comprises a microprocessor.

20. The radar transmitting system of claim 18, wherein after receiving said first external input signal, the controller automatically recommences closing of the transmitter switch after a predetermined period of time has elapsed from the time the first external input signal was received.

21. The radar transmitting system of claim 18, wherein, after receiving said first external input signal, the receipt of a second external input signal causes the controller to recommence closing of the transmitter switch.

22. The radar transmitting system of claim 18, wherein the radiation detector is an infrared detector.

23. An automatic radar transmitting system comprising a plurality of automatic radar transmitters spaced part from one another along a road or system of roads and each simulating the presence of a police-manned radar station, each automatic radar transmitter comprising:

a radar signal generator generating a signal at a frequency and signal strength sufficient to cause an alert status in a radar detector within the range of the transmitter when the signal is transmitted with a microwave antenna;

a microwave antenna for directionally transmitting signals from the signal generator;

a power source comprising a battery and a photovoltaic panel, wherein the battery powers the system and the photovoltaic panel collects solar energy, converting it to electricity which is applied to the battery as charge is expended form the battery;

a transmitter switch between the power source and the signal generator, the switch being response to a control signal;

a controller for controlling the system wherein the controller comprises means for generating control signals and means for responding to external input signals, a first control signal controlling the transmitter switch and closing the switch repeatedly for substantially random durations of time within a selected range of time durations, the switch closings occurring at substantially random time intervals within a selected range of intervals, the controller responding to a first external input signal indicative of the charge on the battery, the controller modifying said first control signal to lengthen the intervals between switch closings beyond said selected range as the power of the battery decreases below a predetermined level, and wherein a second external input signal causes the controller to put the system in an idle state by modifying said first control signal to cease closing the transmitter switch, the controller automatically terminating said idle state when a predetermined period of time has elapsed from the time the idle state was initiated; and a radiation detector for receiving radiation signals and converting them to electrical signals which are input to the controller as external input signals including said second external input signal.

24. An automatic radar transmitting system for simulating the presence of a police-manned radar station, the system comprising:

a radar signal generator generating signals at a frequency and signal strength sufficient to cause an alert status in a radar detector when the signal is transmitted by a microwave antenna;

a microwave antenna for transmitting signals from the signal generator;

a power source for providing electrical power to the system, the power source comprising a battery and a photovoltaic panel, wherein the photovoltaic panel collects solar energy and converts it to electricity which is applied to the battery, replenishing charge to the battery as charge is expended powering the system;

a transmitter switch between the power source and the signal generator; and a controller for controlling the transmitter switch, the controller repeatedly generating a control signal which closes the switch for selected durations of time to cause the radar signal generator to generate said radar signals, said time durations being substantially random within a range of durations, the switch closings occurring at time intervals which are substantially random within a range of intervals, the controller also comprising means for monitoring the charge level of the battery and increasing the time period of the intervals between closings of the transmitter switch as the charge level on the battery decreases.

* * * * *